US010752050B2

(12) United States Patent
Coletta et al.

(10) Patent No.: US 10,752,050 B2
(45) Date of Patent: Aug. 25, 2020

(54) AXLE ASSEMBLY HAVING AN AXLE SHAFT SUBASSEMBLY

(71) Applicant: ArvinMeritor Technology, LLC, Troy, MI (US)

(72) Inventors: Antonio Coletta, Windsor (CA); Jaw-Ping Pan, Lake Orion, MI (US); Gregory D. Pavuk, Berkley, MI (US); Bin Hu, Brighton, MI (US); Walter A. Santarossa, Fraser, MI (US); Phillip Leicht, South Lyon, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 549 days.

(21) Appl. No.: 15/218,248

(22) Filed: Jul. 25, 2016

(65) Prior Publication Data

US 2018/0022154 A1    Jan. 25, 2018

(51) Int. Cl.
| | | |
|---|---|---|
| *B60B 27/02* | (2006.01) | |
| *B60B 35/12* | (2006.01) | |
| *B60B 27/04* | (2006.01) | |
| *B60B 27/06* | (2006.01) | |

(52) U.S. Cl.
CPC .............. *B60B 27/02* (2013.01); *B60B 27/04* (2013.01); *B60B 27/06* (2013.01); *B60B 35/12* (2013.01); *B60B 35/121* (2013.01)

(58) Field of Classification Search
CPC ....... B60B 27/02; B60B 27/06; B60B 27/065; B60B 27/04; B60B 35/121; B60B 35/12
USPC ......................................................... 301/126
See application file for complete search history.

(56) References Cited

U.S. PATENT DOCUMENTS

| | | | | |
|---|---|---|---|---|
| 2,693,393 A | * | 11/1954 | Heth ....................... | B60B 35/18 180/385 |
| 4,331,210 A | * | 5/1982 | Petrak ..................... | B60B 37/08 180/254 |
| 4,431,043 A | * | 2/1984 | Goodell ................ | B60C 23/001 137/224 |
| 4,881,842 A | * | 11/1989 | Farrell ................ | B60B 27/0005 403/19 |
| 5,520,272 A | * | 5/1996 | Ewer ....................... | F16D 11/14 192/36 |
| 5,597,058 A | * | 1/1997 | Ewer ....................... | F16D 11/14 180/247 |
| 5,950,785 A | | 9/1999 | Adachi et al. | |

(Continued)

FOREIGN PATENT DOCUMENTS

| | | |
|---|---|---|
| CN | 202029646 U | 11/2011 |
| CN | 103978836 A | 8/2014 |
| JP | 2006248442 A | 9/2006 |

OTHER PUBLICATIONS

Meritor, Maintenance Manual MM-0361, Heavy-Duty Front Drive Steer Axles MX-140 and MX-160 Series, Revised Apr. 2010.

(Continued)

*Primary Examiner* — Scott A Browne
(74) *Attorney, Agent, or Firm* — Brooks Kushman PC (57) ABSTRACT

An axle assembly having an axle shaft subassembly. The axle shaft subassembly may include an axle shaft and an adapter ring. The adapter ring may receive the axle shaft and may be fixedly positioned with respect to the axle shaft. A hub may receive the adapter ring and may be fixedly positioned with respect to the adapter ring.

21 Claims, 4 Drawing Sheets

(56) References Cited

U.S. PATENT DOCUMENTS

| | | | | |
|---|---|---|---|---|
| 6,254,196 B1* | 7/2001 | Gee | ............ | B60B 27/00 |
| | | | | 301/105.1 |
| 6,572,199 B1* | 6/2003 | Creek | ............ | B60B 35/08 |
| | | | | 301/124.1 |
| 9,109,635 B2 | 8/2015 | Boothby et al. | | |
| 2004/0251650 A1* | 12/2004 | Katsuyama | ......... | A63C 17/223 |
| | | | | 280/87.042 |
| 2015/0059945 A1 | 3/2015 | Flory et al. | | |

OTHER PUBLICATIONS

European Patent Office, Extended European Search Report for the corresponding European Patent Application No. 17182112.7 dated Nov. 29, 2017.

The Patent Office of India, Examination Report for corresponding Indian Application No. 201714025852, dated Jul. 31, 2019.

The State Intellectual Property Office of Peoples Republic of China, First Office Action for corresponding Chinese Application No. 2017106181080, dated Aug. 28, 2019.

Chinese Office Action dated Jun. 8, 2020 for the corresponding Chinese Patent Application No. 201710618108.0; 19 pages.

* cited by examiner

AXLE ASSEMBLY HAVING AN AXLE SHAFT SUBASSEMBLY

TECHNICAL FIELD

This disclosure relates to an axle assembly that includes an axle shaft subassembly.

BACKGROUND

An axle assembly having an axle shaft is disclosed in U.S. Pat. No. 9,109,635.

SUMMARY

In at least one embodiment, an axle assembly is provided. The axle assembly may include an axle shaft subassembly and a hub. The axle shaft subassembly may include an axle shaft and an adapter ring. The axle shaft may be rotatable about an axis. The adapter ring may have an adapter ring hole and an outer adapter ring spline. The adapter ring hole may receive the axle shaft such that the adapter ring may be fixedly positioned with respect to the axle shaft. The outer adapter ring spline may be disposed opposite the adapter ring hole. The hub may have a hub opening and a hub spline. The hub opening may receive the adapter ring. The hub spline may be disposed in the hub opening and may mate with the outer adapter ring spline. As such, the hub may be fixedly positioned with respect to the adapter ring.

In at least one embodiment, an axle assembly is provided. The axle shaft assembly may include a spindle, a hub, and an axle shaft subassembly. The spindle may have a spindle hole and a spindle end surface. The hub may be rotatably disposed on the spindle. The hub may include a first hub end surface, a second hub end surface, a hub opening, and a hub spline. The first hub end surface may be disposed opposite the second hub end surface. The hub opening may extend from the first hub end surface to the second hub end surface and may receive the spindle. The hub spline may be disposed in the hub opening and may extend from the first hub end surface toward the second hub end surface. The axle shaft subassembly may include an axle shaft and an adapter ring. The axle shaft may extend along the axis and may be rotatable about an axis. The axle shaft may extend through the spindle and may have an axle shaft spline. The adapter ring may be received in the hub opening. The adapter ring may include an adapter ring hole, an inner adapter ring spline, and an outer adapter ring spline. The adapter ring hole may receive the axle shaft. The inner adapter ring spline may be arranged around the axis. The inner adapter ring spline may mate with the axle shaft spline to inhibit rotation of the adapter ring with respect to the axle shaft. The outer adapter ring spline may be disposed opposite the inner adapter ring spline. The outer adapter ring spline may mate with the hub spline to inhibit rotation of the hub with respect to the adapter ring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
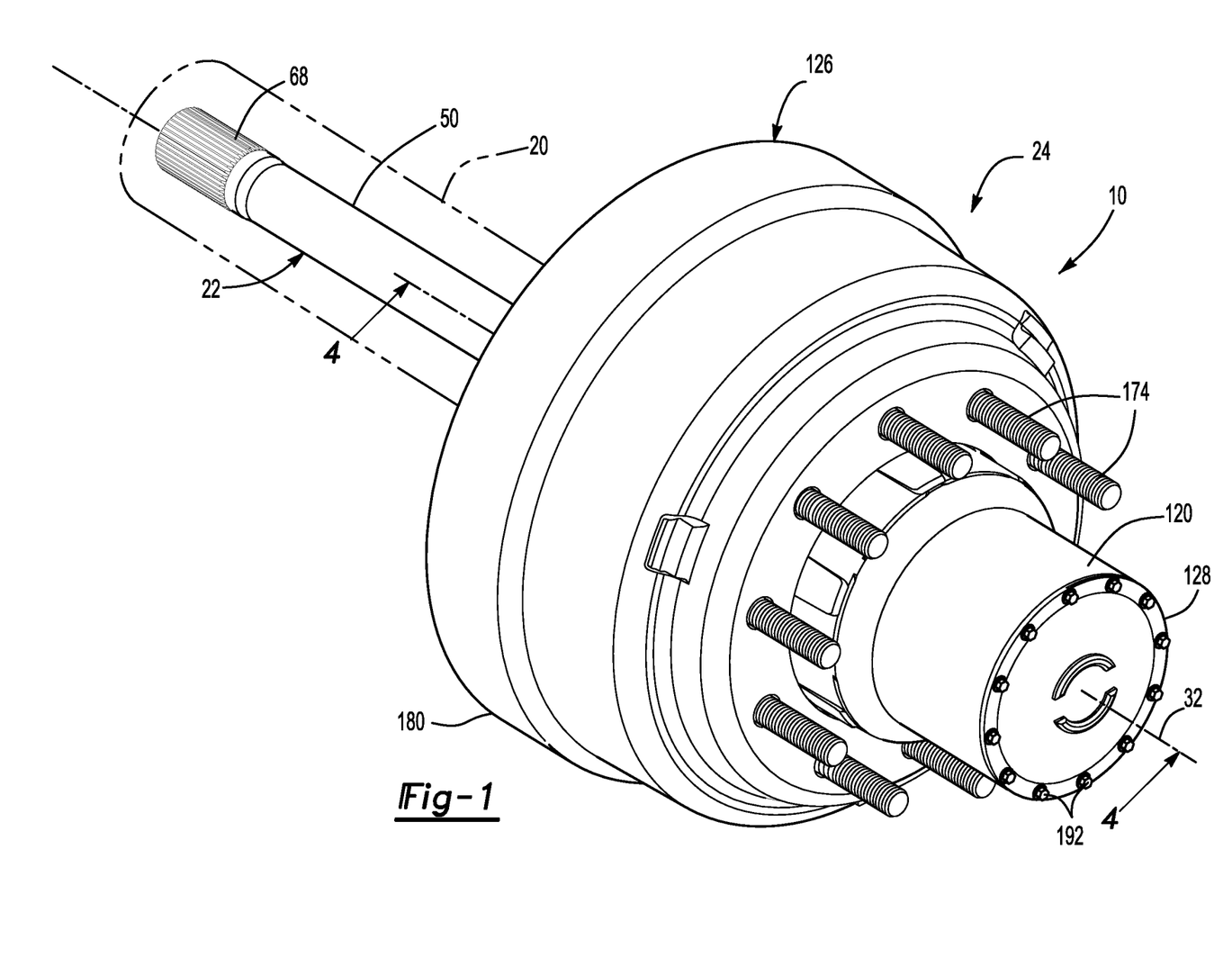
FIG. 1 is a perspective view of a portion of an axle assembly having an axle shaft assembly.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels or a trailer that may be provided with a motor vehicle.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may include an axle housing 20, an axle shaft subassembly 22, and a wheel end assembly 24.

Figure 4:
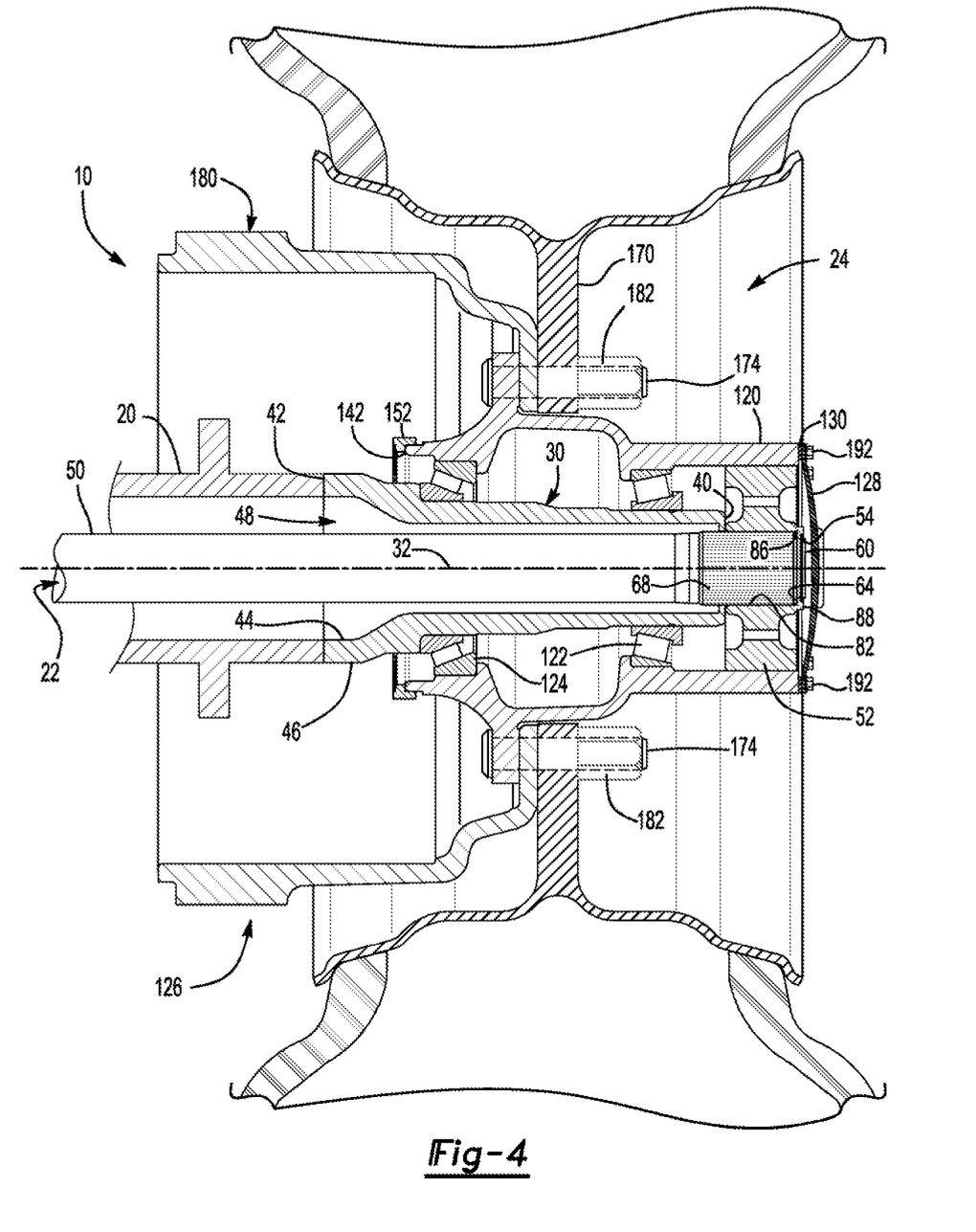
FIG. 4 is a section view along section line 4-4.

Referring to FIG. 1, a portion of the axle housing 20 is shown in phantom. A portion of the axle housing 20 is also shown in FIG. 4. The axle housing 20 may receive various components of the axle assembly 10, such as a differential and associated axle shafts. In addition, the axle housing 20 may facilitate mounting of the axle assembly 10 to the vehicle. The axle housing 20 may define a cavity that may receive at least a portion of the axle shaft subassembly 22. The axle housing 20 may include a spindle 30, which is best shown with reference to FIGS. 2 and 4.

Figure 2:
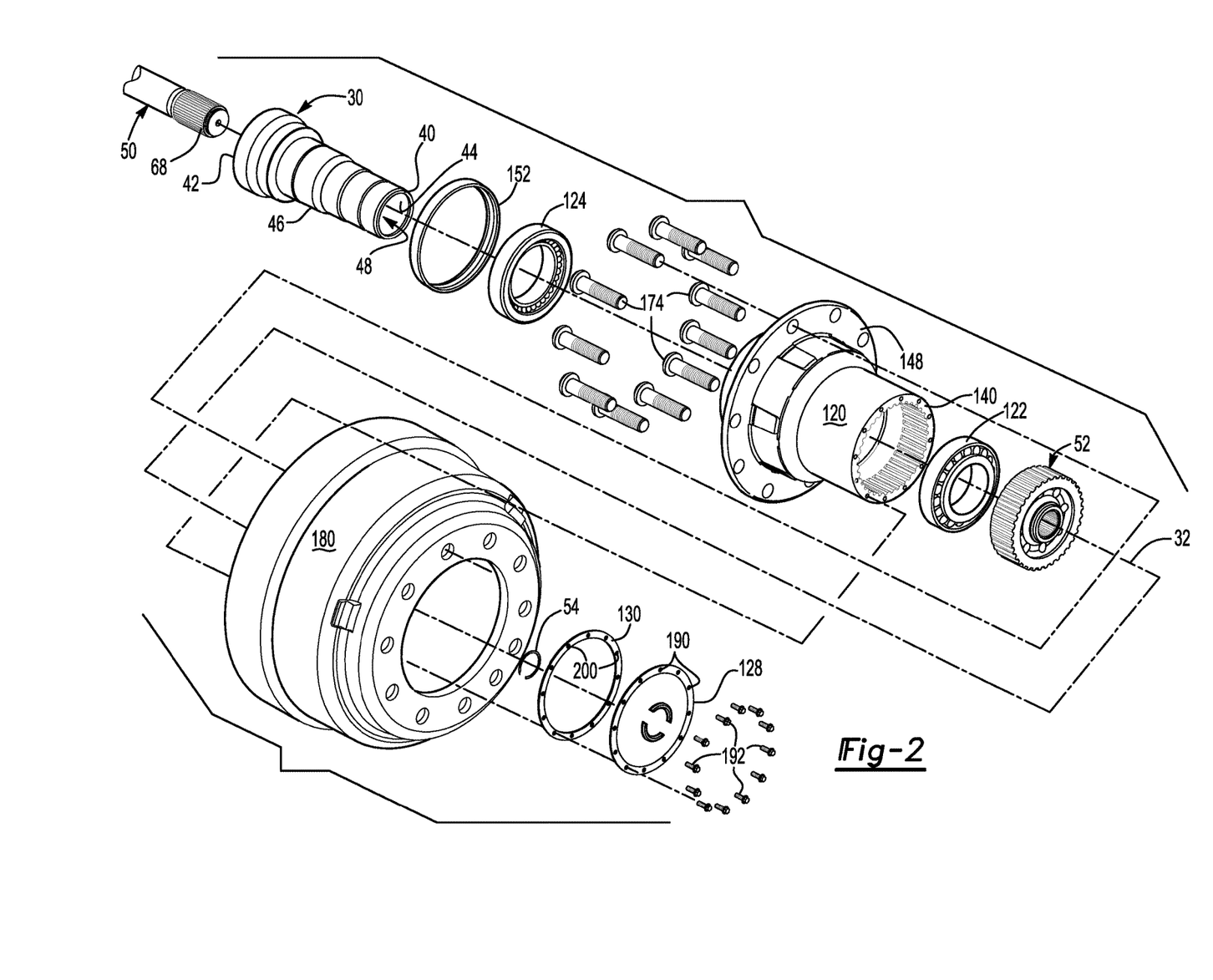
FIG. 2 is an exploded view of a portion of axle assembly.

The spindle 30 may be provided with or may be fixedly positioned with respect to the axle housing 20. For example, the spindle 30 may be integrally formed with the axle housing 20 or may be a separate component that may be fixedly mounted to an end of the axle housing 20. The spindle 30 may extend around an axis 32 but may not rotate about the axis 32. In at least one configuration, the spindle 30 may include a first spindle end surface 40, a second spindle end surface 42, an internal surface 44, an external surface 46, and a spindle hole 48.

The first spindle end surface 40 may be disposed at a free end or distal end of the spindle 30. The first spindle end surface 40 may extend around the axis 32.

The second spindle end surface 42 may be disposed opposite the first spindle end surface 40. The second spindle end surface 42 may be disposed proximate or may engage the axle housing 20 in configurations where the spindle 30 is a separate component from the axle housing 20. The second spindle end surface 42 may be omitted in configurations where the spindle 30 is integrally formed with the axle housing 20.

The internal surface 44 may extend between the first spindle end surface 40 and the second spindle end surface 42. The internal surface 44 may at least partially define the spindle hole 48 through which the axle shaft subassembly 22 may extend. The spindle 30 and its internal surface 44 may be spaced apart from the axle shaft subassembly 22 to permit the axle shaft subassembly 22 to rotate about the axis 32.

The external surface 46 may be disposed opposite the internal surface 44. The external surface 46 of the spindle 30 may support one or more wheel bearing assemblies that may rotatably support the wheel end assembly 24 as will be discussed in more detail below.

Referring to FIGS. 2 and 4, the axle shaft subassembly 22 may provide torque to the wheel end assembly 24 to propel the vehicle. The axle shaft subassembly 22 may include an axle shaft 50, an adapter ring 52, and a retainer 54.

The axle shaft 50 may be rotatable about the axis 32. In addition, the axle shaft 50 may extend along the axis 32 and may extend through the spindle hole 48. The axle shaft 50 may have a first end and a second end.

The first end may be operatively connected to a vehicle drivetrain component, like a differential or an input shaft.

The second end may be disposed opposite the first end. The axle shaft 50 may be coupled to the adapter ring 52 proximate the second end.

Figure 3:
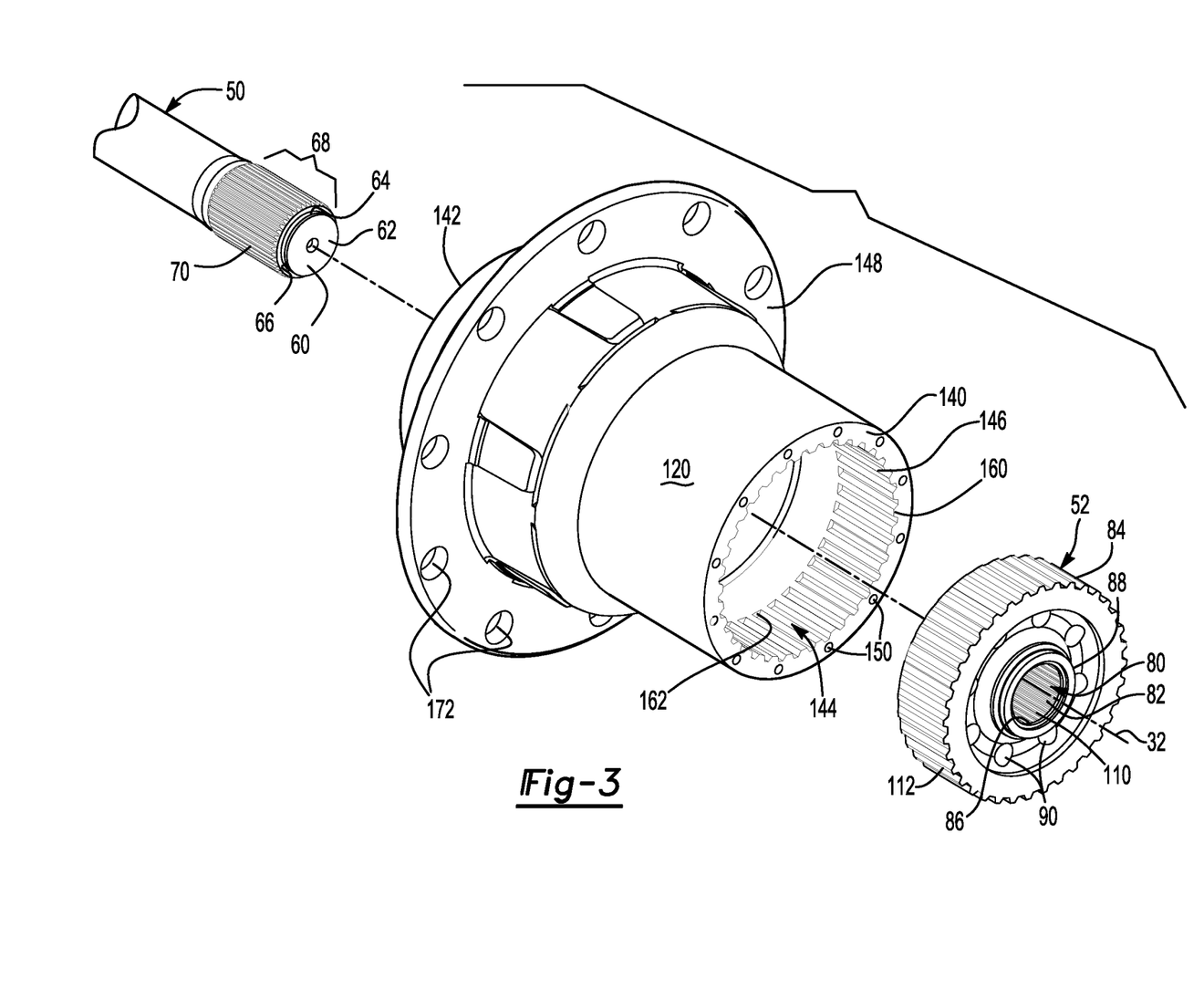
FIG. 3 is a magnified perspective view showing a hub, an axle shaft, and an adapter ring that may be provided with the axle assembly.

As is best shown in FIG. 3, the second end may terminate at an axle end surface 60. The axle end surface 60 may be disposed substantially perpendicular to the axis 32 in one or more embodiments.

An axle protrusion 62 may extend from the axle end surface 60 to an axle step surface 64. The axle protrusion 62 may include a groove 66 that may receive the retainer 54.

The axle step surface 64 may be axially offset from the axle end surface 60. In at least one embodiment, the axle step surface 64 may be disposed substantially parallel to the axle end surface 60. The axle step surface 64 may extend from the axle protrusion 62 toward an axle shaft spline 68.

The axle shaft spline 68 may facilitate mounting of the adapter ring 52 to the axle shaft 50. The axle shaft spline 68 may mate with the adapter ring 52 to inhibit rotation of the adapter ring 52 with respect to the axle shaft 50 as will be discussed in more detail below. As is best shown in FIG. 4, at least a portion of the axle shaft spline 68 may be received in the spindle hole 48. The axle shaft spline 68 may extend around the axis 32 and may include a set of axle shaft spline teeth 70.

As is best shown in FIG. 3, the axle shaft spline teeth 70 may be arranged in a repeating arrangement around the axis 32. The axle shaft spline teeth 70 may be disposed near or adjacent to the axle step surface 64. For example, the axle shaft spline teeth 70 may extend from the axle step surface 64 toward the first end of the axle shaft 50. In at least one embodiment, the axle shaft spline teeth 70 may extend in an axial direction or substantially parallel to the axis 32. The axle shaft spline teeth 70 may be spaced apart from each other such that a gap is provided between adjacent axle shaft spline teeth 70. The gap may receive a spline tooth on the adapter ring 52 as will be discussed in more detail below.

Referring to FIGS. 2-4, the adapter ring 52 may be fixedly positioned with respect to the axle shaft 50. More specifically, the adapter ring 52 may receive the axle shaft 50 and may extend away from the axis 32. As such, the adapter ring 52 may be spaced apart from and may not engage the spindle 30. In at least one configuration, the adapter ring 52 may have an adapter ring hole 80, an inner adapter ring spline 82, an outer adapter ring spline 84, an annular wall 86, a ring 88, and one or more passages 90.

Referring to FIG. 3, the adapter ring hole 80 may receive the axle shaft 50. The adapter ring hole 80 may be a through hole that may be disposed along and may be centered about the axis 32.

The inner adapter ring spline 82 may be disposed in or may extend into the adapter ring hole 80. The inner adapter ring spline 82 may facilitate mounting of the adapter ring 52 to the axle shaft 50. The inner adapter ring spline 82 may mate with the axle shaft spline 68 to inhibit rotation of the adapter ring 52 with respect to the axle shaft 50. The inner adapter ring spline 82 may extend around the axis 32 and may include a set of inner adapter ring spline teeth 110.

The inner adapter ring spline teeth 110 may be arranged around the axis 32. As is best shown with reference to FIGS. 3 and 4, the inner adapter ring spline 82 and the inner adapter ring spline teeth 110 may extend from the annular wall 86 toward the opposite side of the adapter ring 52, such as a side of the adapter ring 52 that faces toward the spindle 30. In at least one embodiment, the inner adapter ring spline teeth 110 may extend in an axial direction or substantially parallel to the axis 32. The inner adapter ring spline teeth 110 may be spaced apart from each other such that a gap is provided between adjacent inner adapter ring spline teeth 110. The gap may receive a spline tooth 70 of the axle shaft spline 68. As such, the axle shaft spline 68 may cooperate with the inner adapter ring spline 82 to inhibit rotation of the adapter ring 52 with respect to the axle shaft 50.

Referring to FIG. 3, the outer adapter ring spline 84 may be disposed opposite the inner adapter ring spline 82 and the adapter ring hole 80. As such, the outer adapter ring spline 84 may extend around and outside circumference of the adapter ring 52. The outer adapter ring spline 84 may facilitate mounting of the adapter ring 52 to a hub of the wheel end assembly 24. More specifically, the outer adapter ring spline 84 may mate with a hub spline of the hub to inhibit rotation of the hub with respect to the adapter ring 52 as will be discussed in more detail below. The outer adapter ring spline 84 may extend around the axis 32 and may include a set of outer adapter ring spline teeth 112.

The outer adapter ring spline teeth 112 may be arranged around the axis 32. The outer adapter ring spline teeth 112 may extend between opposing sides of the adapter ring 52, such as a side of the adapter ring 52 that faces toward the spindle 30 and a side of the adapter ring 52 that faces away from the spindle 30. In at least one embodiment, the outer adapter ring spline teeth 112 may extend in an axial direction or substantially parallel to the axis 32. The outer adapter ring spline teeth 112 may be spaced apart from each other such that a gap is provided between adjacent outer adapter ring spline teeth 112. The gap may receive a spline tooth of the hub as will be discussed in more detail below.

Referring to FIGS. 3 and 4, the annular wall 86 may be disposed in the adapter ring hole 80 and may extend toward the axle shaft 50. More specifically, the annular wall 86 may extend continuously around the axis 32 and may extend toward the axis 32. As is best shown in FIG. 4, the annular wall 86 may extend further toward the axis 32 than the inner adapter ring spline 82. In addition, the annular wall 86 may be axially positioned or positioned along the axis 32 between the retainer 54 and the axle step surface 64. As such, annular wall 86 may help inhibit axial movement of the adapter ring 52. For example, the annular wall 86 may engage the axle step surface 64 to inhibit axial movement of the adapter ring 52 toward the spindle 30 or to the left from the perspective shown in FIG. 4. The annular wall may also engage the retainer 54 to inhibit axial movement of the adapter ring 52 away from the spindle 30, or to the right from the perspective shown in FIG. 4.

Referring to FIG. 3, the ring 88 may extend around the axis 32 and may extend away from the annular wall 86. For instance, the ring 88 may be radially disposed with respect to the axis 32 and may extend from a lateral side of the annular wall 86 toward the retainer 54. As such, the ring 88 may be disposed opposite and may extend away from the inner adapter ring spline 82. The ring 88 may extend around the retainer 54 and may provide a pocket or recess that may receive and help protect the retainer 54.

One or more passages 90 may extend through the adapter ring 52. The passages 90 may be through holes that may be radially positioned between the inner adapter ring spline 82 and the outer adapter ring spline 84. The passages 90 may be spaced apart from each other and may be provided to help reduce the weight of the adapter ring 52.

Referring to FIGS. 2 and 4, the retainer 54 may help secure the adapter ring 52 to the axle shaft 50. The retainer 54 may have any suitable configuration. For instance, the retainer 54 may be configured as a snap ring, collar, pin or other suitable fastener. The retainer 54 may be received in the groove 66 of the axle shaft 50 when the retainer 54 is configured as a snap ring. The retainer 54 may be disposed on the axle shaft 50 and may inhibit axial movement of the adapter ring 52 with respect to the axle shaft 50. For example, the retainer 54 may engage the annular wall 86 of the adapter ring 52 to inhibit axial movement of the adapter ring 52 away from the spindle 30, which is to the right from the perspective shown in FIG. 4.

Referring to FIGS. 1 and 4, the wheel end assembly 24 may be rotatably disposed on the axle housing 20 and may be rotatably coupled to the axle shaft subassembly 22. As is best shown with reference to FIGS. 2 and 4, the wheel end assembly 24 may include a hub 120, a first wheel bearing assembly 122, a second wheel bearing assembly 124, a brake subsystem 126, a cover 128, and a seal 130.

The hub 120 may be rotatably disposed on the spindle 30. As such, the hub 120 may be configured to rotate about the axis 32. The hub 120 may be coupled to the axle shaft subassembly 22 as will be discussed in more detail below. As is best shown in FIG. 3, the hub 120 may have a first hub end surface 140, a second hub end surface 142, a hub opening 144, a hub spline 146, and a mounting flange 148.

The first hub end surface 140 may face toward the cover 128. The first hub end surface 140 may extend around the axis 32 and may generally extend around the adapter ring 52.

A plurality of cover fastener holes 150 may be provided with the first hub end surface 140. The cover fastener holes 150 may be arranged around the axis 32 and may be disposed between an outside circumference of the hub 120 and the hub opening 144 and the hub spline 146.

The second hub end surface 142 may be disposed opposite the first hub end surface 140. As is best shown in FIG. 4, the second hub end surface 142 may extend around the spindle 30 and may facilitate mounting of a tone ring 152 that may be provided with an antilock brake system and may facilitate detection of rotation of the hub 120.

The hub opening 144 may extend from the first hub end surface 140 to the second hub end surface 142. As is best shown in FIG. 4, the hub opening 144 may receive at least a portion of various components of the axle assembly 10, such as the spindle 30, axle shaft 50, adapter ring 52, first wheel bearing assembly 122, and the second wheel bearing assembly 124. As shown in FIG. 4, the outer adapter ring spline 84 may be completely received in the hub opening 144. In one or more embodiments.

Referring to FIG. 3, the hub spline 146 may be disposed in or may extend into the hub opening 144. The hub spline 146 may facilitate mounting of the hub 120 to the adapter ring 52. The hub spline 146 may mate with the outer adapter ring spline 84 to inhibit rotation of the hub 120 with respect to the adapter ring 52. The hub spline 146 may extend around the axis 32 and may include a set of hub spline teeth 160. The hub spline 146 may extend from the first hub end surface 140 toward the second hub end surface 142. For example, the hub spline 146 and the hub spline teeth 160 may extend from the first hub end surface 140 to a hub step surface 162 at which the inside diameter of the hub opening 144 may decrease with respect to the hub spline 146. The hub step surface 162 may be axially positioned between the adapter ring 52 and the first wheel bearing assembly 122.

The hub spline teeth 160 may be arranged around the axis 32. The hub spline teeth 160 may extend from the first hub end surface 140 toward the second hub end surface 142. In at least one embodiment, the hub spline teeth 160 may extend in an axial direction or substantially parallel to the axis 32. The hub spline teeth 160 may be spaced apart from each other such that a gap is provided between adjacent hub spline teeth 160. The gap may receive a spline tooth 112 of the outer adapter ring spline 84. As such, the hub spline 146 may cooperate with the outer adapter ring spline 84 to inhibit rotation of the hub 120 with respect to the adapter ring 52.

The mounting flange 148 may extend away from the axis 32 and the hub opening 144. The mounting flange 148 may facilitate mounting of other components to the hub 120. For example, a portion of the brake subsystem 126 and a wheel 170 may be mounted to the mounting flange 148 as is best shown in FIG. 4. For example, the mounting flange 148 may include a plurality of mounting studs holes 172, which are best shown in FIG. 3, that may be arranged around the axis 32. Each mounting stud hole 172 may receive a corresponding fastener, such as a mounting stud 174 as is best shown in FIG. 4.

The mounting stud 174 may extend through a component of the brake subsystem 126, such as a brake drum 180, and through a corresponding mounting hole in the wheel 170. A lug nut 182 may be threaded onto the mounting stud 174 to secure the wheel 170 to the hub 120. The wheel 170 may be configured to support the tire 184.

Referring to FIGS. 2 and 4, the first wheel bearing assembly 122 may be disposed on the spindle 30 and may rotatably support the hub 120. For example, the first wheel bearing assembly 122 may be disposed on and may extend around the external surface 46 of the spindle 30. The first wheel bearing assembly 122 may be positioned closer to the first spindle end surface 40 and the adapter ring 52 than the second wheel bearing assembly 124. For example, the first wheel bearing assembly 122 may be axially positioned between the adapter ring 52 and the second wheel bearing assembly 124. The first wheel bearing assembly 122 may have any suitable configuration. For instance, the first wheel bearing assembly 122 may include a plurality of rolling elements, such as balls or rollers, that may be disposed between an inner race and an outer race. The inner race may be disposed on and may extend around the external surface 46 of the spindle 30. The outer race may be disposed on the hub 120 and may extend around the inner race.

The second wheel bearing assembly 124 may also be disposed on the spindle 30 and may rotatably support the hub 120. The second wheel bearing assembly 124 may be positioned closer to the axle housing 20 than the first wheel bearing assembly 122. The second wheel bearing assembly 124 may have any suitable configuration. For instance, the second wheel bearing assembly 124 may include a plurality of rolling elements, such as balls or rollers, that may be disposed between an inner race and an outer race.

The brake subsystem 126 may facilitate braking of the wheel to slow rotation of the hub 120 and an associated wheel 170 about the axis 32. The brake subsystem 126 may have any suitable configuration. For instance, the brake subsystem 126 may be configured as a friction brake, such as a disc brake or a drum brake. In FIGS. 1 and 4, a portion of the brake subsystem 126 is shown with a drum brake configuration. In a drum brake configuration, a brake drum 180 may be fixedly disposed on the hub 120 with one or more fasteners, such as the mounting studs 174. The brake drum 180 may extend continuously around brake shoe assemblies (not shown) that may be configured to engage the brake drum 180 to slow rotation of the wheel 170.

Referring to FIGS. 2 and 4, the cover 128 may be coupled to the hub 120. More specifically, the cover 128 may be disposed proximate the first hub end surface 140 and may extend completely across the hub opening 144 to help inhibit contaminants from entering the axle assembly 10. As such, the cover 128 may be positioned at an end of the hub 120 and the adapter ring 52 may be axially positioned between the cover 128 and the first wheel bearing assembly 122. In at least one embodiment, the cover 128 may have a dome-like configuration that may arch over the axle shaft 50 such that a gap may be provided between the axle end surface 60 and the cover 128. As such, the cover 128 may be spaced apart from and may not engage the axle shaft 50. As is best shown in FIG. 2, the cover 128 may include a plurality of cover fastener openings 190.

The cover fastener openings 190 may be arranged around the axis 32. Each cover fastener opening 190 may be aligned with a corresponding cover fastener hole 150 on the hub 120 and may receive a corresponding cover fastener 192 that may attach the cover 128 to the hub 120. The cover fasteners 192 may have any suitable configuration. For example, the cover fasteners 192 may be configured as bolts, screws, pins or the like.

Referring to FIGS. 2 and 4, the seal 130 may be disposed between the hub 120 and the cover 128. For example, the seal 130 may extend from the first hub end surface 140 to the cover 128. The seal 130 may cooperate with the cover 128 to help prevent or inhibit contaminants from entering the hub opening 144. The seal 130 may have any suitable configuration. For instance, the seal 130 may be configured as a ring that may extend continuously around the axis 32. As is best shown in FIG. 2, the seal 130 may include a plurality of holes 200 through which the cover fasteners 192 may extend; however, it is contemplated that the holes 200 may be omitted in the seal 130 may be disposed radially inward or outward with respect to the cover fasteners 192 in one or more embodiments. In at least one embodiment, the seal 130 may separate the cover 128 from the hub 120 such that the cover 128 does not engage the first hub end surface 140.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a spindle;
an axle shaft subassembly that includes:
an axle shaft that is rotatable about an axis; and
an adapter ring that has an adapter ring hole that receives the axle shaft and an outer adapter ring spline that is disposed opposite the adapter ring hole;
a hub that is rotatably disposed on the spindle and that has a hub opening that receives the adapter ring and a hub spline that is disposed in the hub opening and that mates with the outer adapter ring spline;
a cover that is coupled to a first hub end surface that extends around the axis, wherein the cover extends completely across the hub opening;
a seal that extends around the axis and extends from the cover to the first hub end surface; and
a cover fastener that attaches the cover to the hub, wherein the cover fastener extends through a hole in the seal;
wherein the adapter ring is fixedly positioned with respect to the axle shaft and the hub is fixedly positioned with respect to the adapter ring such that the adapter ring is not moveable in an axial direction with respect to the axle shaft and the spindle.

2. The axle assembly of claim 1 wherein the outer adapter ring spline is completely received in the hub opening.

3. The axle assembly of claim 1 wherein the axle shaft has an axle shaft spline that is arranged around the axis and the adapter ring has an inner adapter ring spline that is disposed opposite the outer adapter ring spline, wherein the axle shaft spline mates with the inner adapter ring spline to inhibit rotation of the adapter ring with respect to the axle shaft.

4. The axle assembly of claim 3 wherein the adapter ring further comprises a plurality of passages that extend through the adapter ring and are radially positioned between the inner adapter ring spline and the outer adapter ring spline.

5. The axle assembly of claim 1 wherein the cover is spaced apart from and does not engage the axle shaft and the hub.

6. The axle assembly of claim 1 further comprising a retainer that is disposed on the axle shaft and that inhibits axial movement of the adapter ring with respect to the axle shaft.

7. The axle assembly of claim 6 wherein the adapter ring has an annular wall that extends around the axis and toward the axis such that the annular wall is axially disposed between the retainer and an axle step surface.

8. The axle assembly of claim 7 wherein the retainer engages the annular wall to inhibit axial movement of the adapter ring toward the cover.

9. The axle assembly of claim 7 wherein the adapter ring further comprises a ring that extends from the annular wall and is disposed on an opposite side of the annular wall from an inner adapter ring spline, wherein the ring extends around the retainer.

10. An axle assembly comprising:
an axle shaft subassembly that includes:
an axle shaft that is rotatable about an axis and that has an axle step surface; and
an adapter ring that has an adapter ring hole that receives the axle shaft, an outer adapter ring spline that is disposed opposite the adapter ring hole, and an annular wall that extends around the axis and toward the axis; and
a hub that has a hub opening that receives the adapter ring and a hub spline that is disposed in the hub opening and that mates with the outer adapter ring spline;
wherein the adapter ring is fixedly positioned with respect to the axle shaft and the hub is fixedly positioned with respect to the adapter ring and the axle step surface engages the annular wall to inhibit axial movement of the adapter ring away from a retainer that is disposed on the axle shaft and that inhibits axial movement of the adapter ring with respect to the axle shaft and the annular wall is axially disposed between the retainer and the axle step surface.

11. The axle assembly of claim 10 further comprising a cover that is coupled to a first hub end surface that extends around the axis, wherein the cover extends completely across the hub opening.

12. The axle assembly of claim 11 further comprising a seal that extends around the axis and extends from the cover to the first hub end surface.

13. The axle assembly of claim 12 further comprising a cover fastener that attaches the cover to the hub, wherein the cover fastener extends through a hole in the seal.

14. An axle assembly comprising:
a spindle that has a spindle hole;
a hub that is rotatably disposed on the spindle, wherein the hub includes:
 a first hub end surface;
 a second hub end surface disposed opposite the first hub end surface;
 a hub opening that extends from the first hub end surface to the second hub end surface and that receives the spindle;
 a hub spline that is disposed in the hub opening and that extends from the first hub end surface toward the second hub end surface; and
 a hub step surface disposed at an end of the hub spline; and
an axle shaft subassembly that includes:
 an axle shaft that extends along and is rotatable about an axis, wherein the axle shaft extends through the spindle and has an axle shaft spline; and
 an adapter ring that is received in the hub opening, wherein the adapter ring includes:
  an adapter ring hole that receives the axle shaft;
  an inner adapter ring spline that is arranged around the axis and that mates with the axle shaft spline to inhibit rotation of the adapter ring with respect to the axle shaft; and
  an outer adapter ring spline that is disposed opposite the inner adapter ring spline and mates with the hub spline to inhibit rotation of the hub with respect to the adapter ring, wherein an end of the outer adapter ring spline engages the hub step surface to inhibit axial movement of the adapter ring toward the spindle; and
a cover that is mounted to the hub and extends across the hub opening, wherein the adapter ring is spaced apart from the cover.

15. The axle assembly of claim 14 wherein the adapter ring is spaced apart from and does not engage the spindle.

16. The axle assembly of claim 14 wherein at least a portion of the axle shaft spline is received in the spindle hole.

17. The axle assembly of claim 14 wherein the axle shaft spline is disposed between the cover and a first spindle end surface of the spindle.

18. The axle assembly of claim 17 further comprising a first wheel bearing assembly that rotatably supports the hub, wherein the first wheel bearing assembly is disposed on the spindle in the hub opening and the adapter ring is disposed between the first wheel bearing assembly and the cover.

19. The axle assembly of claim 18 wherein the hub spline extends from the first hub end surface toward the first wheel bearing assembly.

20. The axle assembly of claim 19 wherein teeth of the hub spline terminate at the hub step surface of the hub, wherein the hub step surface is disposed in the hub opening between the first wheel bearing assembly and the adapter ring.

21. An axle assembly comprising:
a spindle;
an axle shaft subassembly that includes:
 an axle shaft that extends through the spindle and is rotatable about an axis, the axle shaft including an axle protrusion that extends from an axle end surface that is disposed at an end of the axle shaft to an axle step surface of the axle shaft that is spaced apart from the axle end surface, wherein the axle step surface extends radially outward from the axle protrusion; and
 an adapter ring that has an adapter ring hole that receives the axle shaft and an outer adapter ring spline that is disposed opposite the adapter ring hole, wherein the axle step surface engages the adapter ring to inhibit axial movement of the adapter ring toward the spindle; and
a hub that has a hub opening that receives the adapter ring and a hub spline that is disposed in the hub opening and that mates with the outer adapter ring spline;
wherein the adapter ring is fixedly positioned with respect to the axle shaft and the hub is fixedly positioned with respect to the adapter ring.

* * * * *